(12) United States Patent
Wang et al.

(10) Patent No.: US 6,850,833 B1
(45) Date of Patent: Feb. 1, 2005

(54) SYSTEM FOR DIAGNOSING DELTA PRESSURE SENSOR OPERATION

(75) Inventors: Yue Yun Wang, Columbus, IN (US); Peter Rauznitz, Columbus, IN (US); Martin T. Brooks, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/700,104

(22) Filed: Nov. 3, 2003

(51) Int. Cl.$^7$ ...................... F02M 25/07; G01M 19/00; G01P 5/00
(52) U.S. Cl. ................. 701/108; 73/118.2; 123/568.12; 60/602; 60/605.2; 701/114; 701/115
(58) Field of Search ...................... 123/568.11, 568.12, 123/568.16, 568.21, 565.25–565.27; 60/602, 605.2; 701/108, 114, 115; 73/115, 116, 117.2, 117.3, 118.1, 118.2

(56) References Cited

U.S. PATENT DOCUMENTS

| | | | |
|---|---|---|---|
| 4,690,120 A | * 9/1987 | Egle ...................... 123/568.16 |
| 5,349,936 A | 9/1994 | Uchinami .................... 123/676 |
| 5,542,400 A | 8/1996 | Matsumoto et al. ... 123/568.16 |
| 5,635,633 A | 6/1997 | Kadota ...................... 73/118.1 |
| 5,698,780 A | 12/1997 | Mizutani et al. ........... 73/118.2 |
| 5,808,189 A | 9/1998 | Toyoda ...................... 73/118.2 |
| 6,024,075 A | 2/2000 | Bidner et al. .......... 123/568.16 |
| 6,085,132 A | 7/2000 | Ishii et al. ...................... 701/29 |
| 6,164,270 A | 12/2000 | Bidner et al. .......... 123/568.16 |
| 6,236,908 B1 | 5/2001 | Cheng et al. ............... 701/102 |
| 6,253,749 B1 | * 7/2001 | Kotwicki et al. ...... 123/568.27 |
| 6,257,214 B1 | 7/2001 | Bidner et al. ........... 123/568.16 |
| 6,308,694 B1 | * 10/2001 | Kotwicki et al. ...... 123/568.16 |
| 6,321,732 B1 | * 11/2001 | Kotwicki et al. ...... 123/568.16 |
| 6,363,922 B1 | 4/2002 | Romzek et al. ........ 123/568.16 |
| 6,370,935 B1 | 4/2002 | He et al. ...................... 73/1.34 |
| 6,382,199 B2 | 5/2002 | Nusser et al. ............... 123/690 |
| 6,434,456 B1 | 8/2002 | Babala et al. .................. 701/34 |
| 6,457,461 B1 | 10/2002 | Romzek ................ 123/568.16 |
| 6,470,866 B2 | * 10/2002 | Cook ..................... 123/568.27 |
| 6,588,210 B2 | * 7/2003 | Kreso .......................... 60/602 |
| 6,659,095 B2 | * 12/2003 | Kotwicki et al. ...... 123/568.16 |
| 6,687,600 B2 | * 2/2004 | Russell et al. .............. 701/108 |
| 6,687,601 B2 | * 2/2004 | Bale et al. .................. 701/108 |
| 6,763,708 B2 | * 7/2004 | Ting et al. .................. 73/118.1 |
| 2002/0027774 A1 | 3/2002 | Nishiyama .................... 362/29 |
| 2004/0144166 A1 | * 7/2004 | Cullen et al. ............... 73/118.2 |

* cited by examiner

Primary Examiner—Willis R. Wolfe, Jr.
(74) Attorney, Agent, or Firm—Barnes & Thornburg (57) ABSTRACT

A system for diagnosing operation of a delta pressure sensor used with an internal combustion engine comprises an intake manifold and an exhaust manifold each operatively coupled to the engine, an EGR conduit fluidly coupled between the intake and exhaust manifolds, and a flow restriction mechanism disposed in-line with the EGR conduit, wherein the delta pressure sensor produces a delta pressure signal indicative of a pressure differential across the flow restriction mechanism. A control computer compares the delta pressure signal to a modeled delta pressure value modeled as a function of at least engine speed and one of engine load and engine output torque percentage, and diagnoses a fault state of the delta pressure sensor based on the comparison.

26 Claims, 7 Drawing Sheets

SYSTEM FOR DIAGNOSING DELTA PRESSURE SENSOR OPERATION

FIELD OF THE DISCLOSURE

The present invention relates generally to systems for monitoring the operation of a delta pressure sensor used with an internal combustion engine, and more specifically to such systems for diagnosing faults or failure conditions associated delta pressure sensor operation.

BACKGROUND OF THE DISCLOSURE

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to selectively introduce (i.e., recirculate) exhaust gas from the exhaust manifold into the fresh air stream flowing to the intake manifold via an EGR conduit coupled between the intake and exhaust manifolds. Through the use of an on-board microprocessor, control of an EGR valve disposed in-line with the EGR conduit is typically accomplished as a function of information supplied by a number of engine operational sensors to thereby control EGR flow.

It is desirable in such systems to monitor a pressure differential across a flow restriction mechanism disposed in-line with the EGR conduit via a differential or delta pressure sensor arrangement, wherein the flow restriction mechanism may be the EGR valve itself or another known flow restriction arrangement. It is further desirable in such systems to monitor the operation of the delta pressure sensor to insure that the information provided by this sensor is reliable. What is therefore needed is a system for monitoring delta pressure sensor operation and diagnosing delta pressure sensor faults or failure conditions as they may occur.

SUMMARY OF THE DISCLOSURE

The present invention may comprise one or more of the following features and combinations thereof. A system for diagnosing operation of a delta pressure sensor used with an internal combustion engine comprises an intake manifold and an exhaust manifold each operatively coupled to the engine, an EGR conduit fluidly coupled between the intake and exhaust manifolds, and a flow restriction mechanism disposed in-line with the EGR conduit, wherein the delta pressure sensor produces a delta pressure signal indicative of a pressure differential across the flow restriction mechanism. A control computer compares the delta pressure signal to a modeled delta pressure value modeled as a function of at least engine speed and one of engine load and engine output torque percentage, and diagnoses a fault state of the delta pressure sensor based on the comparison.

The flow restriction mechanism may be an EGR valve having an actuator responsive to an actuator signal to control exhaust gas flow through the EGR valve, wherein the control computer is configured to produce the actuator signal. Alternatively or additionally, the system may include the EGR valve and the flow restriction mechanism may be disposed in-line with the EGR conduit between the EGR valve and the intake manifold.

The system may further include an engine speed sensor producing an engine speed signal indicative of engine rotational speed, and the control computer may be configured to determine an engine load value as a function of engine fueling. The control computer may further be configured to determine the modeled delta pressure value as a function of the engine speed signal and the engine load value according to one predefined delta pressure model. Alternatively, the control computer may be configured to determine an engine output torque percentage, and to determine the modeled delta pressure value as a function of the engine speed signal and the engine output torque percentage according to another predefined delta pressure model. In either case, the control computer is operable to determine a residual value as a difference between the delta pressure signal and the modeled delta pressure value, and to diagnose the fault state of the delta pressure sensor based on the residual value. In this embodiment, the control computer may be configured to control the actuator signal to command the EGR valve to a predefined valve position prior to determining the modeled delta pressure value. The system may further include a turbocharger operatively coupled to the intake and exhaust manifolds, wherein the turbocharger has a variable geometry turbine (VGT) mechanism with an actuator responsive to an actuator signal to control a swallowing capacity or efficiency of the turbocharger, and in this embodiment the control computer may be additionally configured to control the actuator signal to command the VGT mechanism to a predefined VGT position prior to determining the modeled delta pressure value. The system in this embodiment may further include a memory having a delta pressure sensor diagnostic flag stored therein, and the control computer may further include a flag counter operable to increment a count value if the residual value exceeds a threshold residual value and to otherwise decrement the count value. The control computer may be operable to diagnose the fault state of the delta pressure sensor by setting the delta pressure sensor diagnostic flag if the count value exceeds a high count threshold and clearing the delta pressure sensor diagnostic flag if the count value drops below a low count threshold. The control computer in this embodiment may further include diagnostic enable logic configured to enable operation of the flag counter only if a number of diagnostic enable conditions are met. The diagnostic enable logic may be configured to enable operation of the flag counter only if the number of diagnostic enable conditions are met for a calibratible time period.

Alternatively, the system may include a memory having the modeled delta pressure value stored therein in the form of a delta pressure threshold value based on a predefined delta pressure model, and the control computer may be configured to diagnose the fault state of the delta pressure sensor based on the comparison between the delta pressure signal and the delta pressure threshold value. The control computer may further be configured to command the EGR valve to a predefined valve position prior to diagnosing the fault state of the delta pressure sensor. The control computer may further be configured to command the VGT mechanism to a predefined VGT position prior to determining the modeled delta pressure value. The control computer may further be configured to command the engine speed to a predefined engine speed range prior to diagnosing the fault state of the delta pressure sensor. In this embodiment, the system may further include a memory having a delta pressure sensor diagnostic flag stored therein, and the control computer may further include a flag counter operable to increment a count value if the delta pressure signal exceeds the delta pressure threshold value and to otherwise decrement the count value. The control computer may be configured to diagnose the fault state of the delta pressure sensor by setting the delta pressure sensor diagnostic flag if the count value exceeds a high count threshold and clearing the delta pressure sensor diagnostic flag if the count value drops below a low count threshold. The control computer in this embodiment may further include diagnostic enable logic configured to enable operation of the flag counter only if a number of diagnostic enable conditions are met. One of the number of diagnostic enable conditions may correspond to the engine load being within a predefined range of engine load values. Alternatively, one of the number of diagnostic enable conditions may corresponds to the engine output torque percentage being within a predefined range of engine output torque percentage values. Alternatively or additionally, one of the number of diagnostic enable conditions may correspond to the engine speed being within a predefined range of engine speed values. Alternatively or additionally, one of the number of diagnostic enable conditions may correspond to the EGR valve position signal indicating a position of the EGR valve greater than a predefined EGR valve position. In any case, the diagnostic enable logic may further be configured to enable operation of the flag counter only if the number of diagnostic enable conditions are met for a calibratible time period.

These and other objects of the present invention will become more apparent from the following description of the illustrative embodiments.

DESCRIPTION OF THE ILLUSTRATIVE EMBODIMENTS

For the purpose of promoting an understanding of the principles of this disclosure, reference will now be made to one or more embodiments illustrated in the drawings and specific language will be used to describe the same. It will nevertheless be understood that no limitation of the scope of the disclosure is thereby intended.

Figure 1:
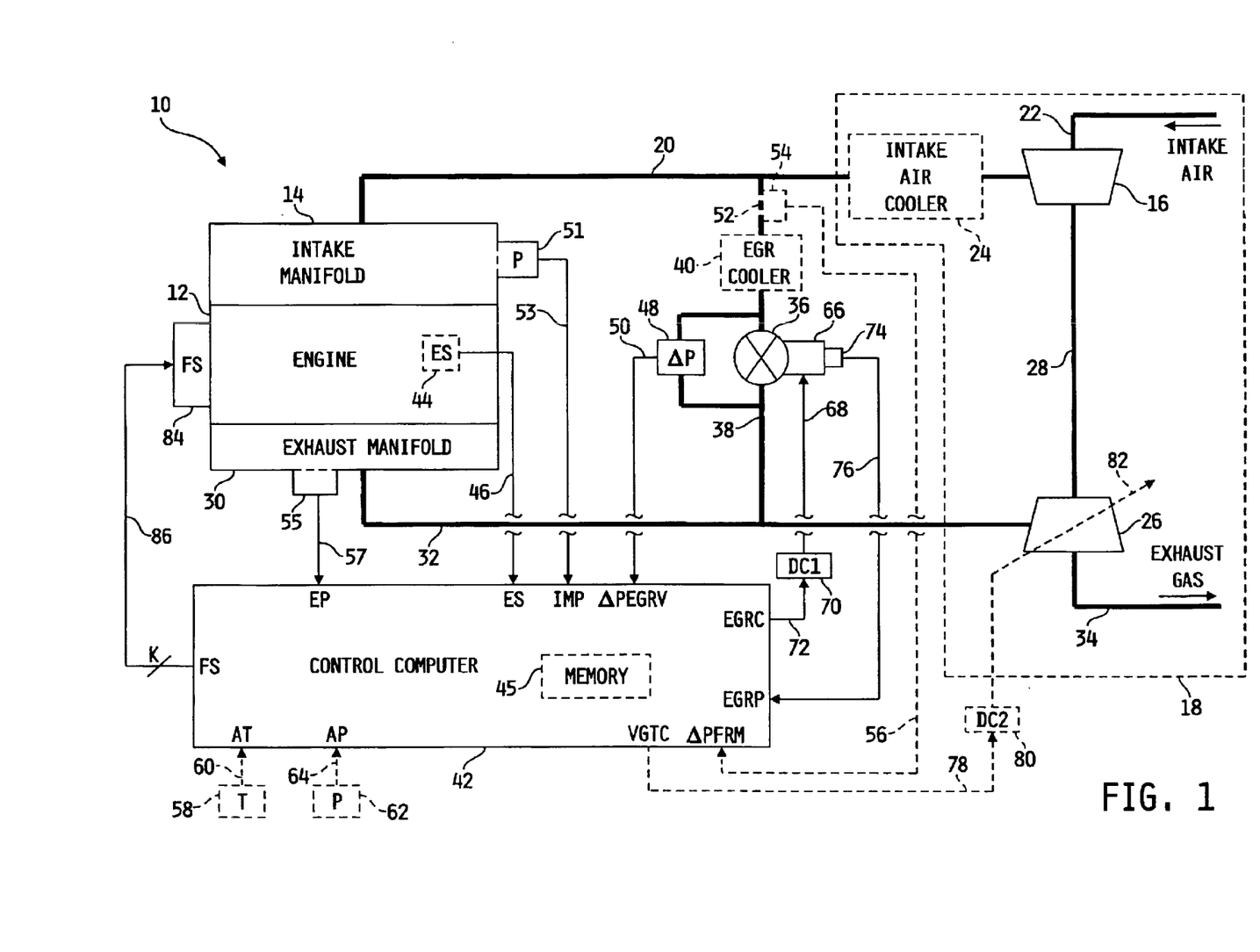
FIG. 1 is a diagram of one illustrative embodiment of a system for diagnosing delta pressure sensor operation.

Referring now to FIG. 1, a diagram of one illustrative embodiment of a system 10 for diagnosing the operation of a delta pressure sensor used with an internal combustion engine is shown. System 10 includes an internal combustion engine 12 having an intake manifold 14 fluidly coupled to an intake conduit 20, and an exhaust manifold 30 fluidly coupled to an exhaust conduit 32. System 10 may further include a turbocharger as shown surrounded by a dash-lined perimeter 18 in FIG. 1. In embodiments of system 10 including turbocharger 18, a turbocharger compressor 16 includes a compressor inlet coupled to an intake conduit 22 for receiving fresh ambient air therefrom, and a compressor outlet fluidly coupled to intake conduit 20. Optionally, as shown in phantom in FIG. 1, system 10 may include an intake air cooler 24 of known construction disposed in-line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to exhaust conduit 32 and a turbine outlet fluidly coupled to ambient via an exhaust conduit 34.

In any case, an exhaust gas recirculation system comprising part of system 10 includes an EGR conduit 38 fluidly connected between exhaust conduit 32 and intake conduit 20. EGR conduit 38 includes at least one flow restriction mechanism disposed in-line therewith. In the illustrated embodiment, one flow restriction mechanism included within system 10 is an EGR valve 36 of known construction, wherein EGR valve 36 is electronically controllable to selectively control the flow of recirculated exhaust gas therethrough from the exhaust manifold to the intake manifold 14. In this embodiment, system 10 may optionally include an EGR cooler 40, as shown in phantom in FIG. 1, having an EGR inlet fluidly coupled via conduit 38 to an exhaust gas outlet of EGR valve 36, and having an EGR outlet fluidly coupled via conduit 38 to the intake conduit 20. The EGR cooler 40 is configured in a known manner to cool recirculated exhaust gas flowing therethrough. Alternatively or additionally, as illustrated in phantom in FIG. 1, a flow restriction mechanism 52, may be disposed in-line with the EGR conduit 38 anywhere along its length, and in the illustrated embodiment the flow restriction mechanism 52 is disposed in-line with the EGR conduit 38 between the EGR outlet of the EGR cooler 40 and the air intake conduit 20. The flow restriction device 52 may be of known construction that may or may not be electronically controllable to selectively control the flow of recirculated exhaust gas therethrough. In the illustrated embodiment, for example, the flow restriction mechanism is provided in the form of a flow restriction orifice defining a fixed cross-sectional flow area therethrough that is less than the cross-sectional flow area through EGR conduit 38.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for diagnosing EGR flow rate operation. Control computer 42 includes a number of inputs for receiving signals from various sensors or sensing systems associated with system 10. For example, system 10 includes an engine speed sensor 44 electrically connected to an engine speed input, ES, of control computer 42 via signal path 46. Engine speed sensor 44 is operable to sense the rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 further includes a differential pressure sensor, or ΔP sensor, 48 having one inlet fluidly coupled to EGR conduit 38 upstream of the EGR valve 36, and an opposite inlet fluidly coupled to EGR conduit 38 downstream of the EGR valve 36. The ΔP sensor 48 may be of known construction and is electrically connected to an EGR valve delta pressure sensor input, ΔPEGRV, of control computer 42 via signal path 50. The ΔP sensor 48 is operable to provide a differential pressure signal on signal path 50 indicative of the pressure differential across EGR valve 36.

In embodiments of system 10 including flow restriction mechanism 52, system 10 may further include another differential pressure sensor, or ΔP sensor, 54 as shown in phantom in FIG. 1, having one inlet fluidly coupled to EGR conduit 38 upstream of the flow restriction mechanism 52, and an opposite inlet fluidly coupled to EGR conduit 38 downstream of the flow restriction mechanism 52. The ΔP sensor 54 may be of known construction and is electrically connected to a flow restriction mechanism delta pressure sensor input, ΔPFRM, of control computer 42 via signal path 56. The ΔP sensor 54 is operable to provide a differential pressure signal on signal path 56 indicative of the pressure differential across the flow restriction mechanism 52.

System 10 may optionally include a suitably located ambient air temperature sensor 58 electrically connected to an ambient temperature input, AT, of control computer 42 via signal path 60, as shown in phantom in FIG. 1. Ambient temperature sensor 58 may be of known construction, and is operable to produce a temperature signal on signal path 60 indicative of the temperature of ambient air. System 10 may further optionally include a suitably located ambient air pressure sensor 62 electrically connected to an ambient pressure input, AP, of control computer 42 via signal path 64. Ambient pressure sensor 62 may be of known construction, and is operable to produce a pressure signal on signal path 64 indicative of the pressure of ambient air.

System 10 further includes an intake manifold pressure sensor 51 disposed in fluid communication with intake manifold 14 and electrically connected to an intake manifold pressure input, IMP, of control computer 42 via signal path 53. Alternatively, pressure sensor 51 may be disposed in fluid communication with intake conduit 20. In any case, pressure sensor 51 may be of known construction, and is operable to produce a pressure signal on signal path 53 indicative of the pressure within intake conduit 20 and intake manifold 14.

System 10 further includes an exhaust manifold pressure sensor 55 disposed in fluid communication with the exhaust manifold 30 and electrically connected to an exhaust pressure input, EP, of control computer 42 via signal path 83. Alternatively, pressure sensor 54 may be disposed in fluid communication with the exhaust conduit 32 upstream of the junction of exhaust conduit 32 and EGR conduit 38. In any case, pressure sensor 81 may be of known construction, and is operable to produce a pressure signal on signal path 83 indicative of exhaust gas pressure within exhaust manifold 30 and exhaust conduit 32.

Control computer 42 also includes a number of outputs for controlling one or more engine functions associated with system 10. For example, EGR valve 36 includes an EGR valve actuator 66 electrically connected to an output of a first actuator drive circuit 70 via signal path 68, wherein the first actuator drive circuit 70 has an input electrically connected to an EGR valve control output, EGRC, of control computer 42 via signal path 72. The first actuator drive circuit 70 is responsive to an EGR valve control signal produced by control computer 42 on signal path 72 to produce a corresponding EGR valve actuator drive signal, and actuator 66 is responsive to the EGR valve actuator drive signal to control the position of EGR valve 36 relative to a reference position in a known manner. Control computer 42 is accordingly operable to control EGR valve 36 in a known manner to selectively provide a flow of recirculated exhaust gas from exhaust manifold 30 to intake manifold 14.

EGR valve 36 further includes an EGR position sensor 74 electrically connected to an EGR valve position input, EGRP, of control computer 42 via signal path 76. Sensor 74 may be of known construction and is operable to determine a position of EGR valve 36 by determining a position of EGR valve actuator 70 relative to a reference actuator position, and producing a position signal on signal path 76 indicative of the position of EGR valve 36 relative to a reference position.

System 10 may further include a variable geometry turbocharger mechanism, illustrated in phantom by reference number 82. The variable geometry turbocharger (VGT) mechanism 82, for purposes of this document, may be or include any known mechanism operable to control the swallowing capacity and/or efficiency of the turbocharger 18, and examples of such mechanisms include, but are not limited to, any one or combination of a turbocharger actuator responsive to an actuator drive signal to selectively control the internal geometry of the turbocharger turbine 26, a wastegate valve and actuator assembly responsive to an actuator drive signal to selectively divert exhaust gas flow around turbine 26, an exhaust throttle and actuator assembly responsive to an actuator drive signal to selectively control the cross-sectional flow area of exhaust conduit 32 and/or exhaust conduit 34, or the like. In any case, a second actuator drive circuit 80 (shown in phantom in FIG. 1) has an output that produces the actuator drive signal, and an input electrically connected to a variable geometry turbocharger control output, VGTC, of control computer 42 via signal path 78. The second actuator drive circuit 80 is responsive to the variable geometry turbocharger control signal produced by control computer 42 on signal path 78 to produce one or more actuator drive signals, and any one or more of the VGT actuators may be responsive to corresponding ones of the actuator drive signals to control the position of an associated VGT mechanism actuator relative to a reference position in a known manner. Control computer 42 is accordingly operable to any such VGT mechanism in a known manner to selectively control the swallowing capacity and/or efficiency of the turbocharger 18.

System 10 further includes a fuel system 84 electrically connected to a fuel signal output, FS, of control computer 42 via a number, K, of signal paths 86 wherein K may be any positive integer. Fuel system 84 is responsive to the fueling signals, FS, produced by control computer 42 to supply fuel to engine 12 in a known manner.

Figure 2:
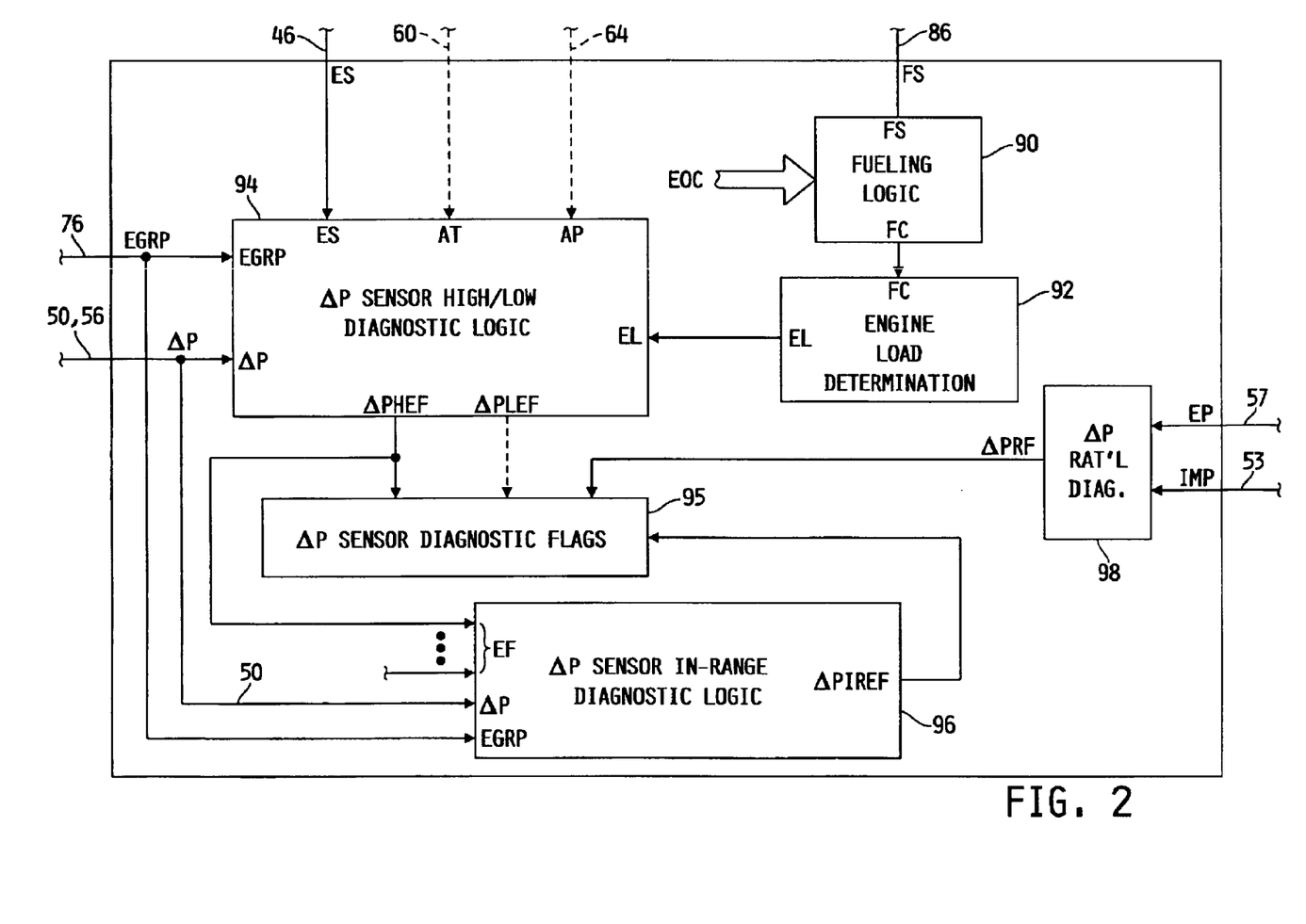
FIG. 2 is a block diagram of one illustrative configuration of some of the internal features of the control computer of FIG. 1 as they relate to diagnosing delta pressure sensor operation.

Referring now to FIG. 2, a block diagram of one illustrative configuration of some of the internal features of the control computer 42 of FIG. 1, as they relate to diagnosing operation of the delta pressure sensor 62, is shown. Control computer 42 includes a fueling logic block 90 receiving as inputs a number of engine operating condition values, EOC, including, for example, engine speed and other engine operating parameters. Block 90 is responsive to the number of engine operating condition values, EOC, to determine a fueling command value, FC, as a function of these various fueling parameters, in a manner well known in the art, and to produce the fueling signal, FS, as a function of the fueling command, FC. The fuel system 84 is responsive to the fueling signal, FS, to supply fuel to engine 12 as described hereinabove.

Control computer 42 further includes an engine load determination block 92 receiving the fueling command value, FC, from the fueling logic block 90. Block 92 is responsive to the fueling command value, FC, to determine an engine load value, EL, in a conventional manner. In one embodiment, for example, block 92 is operable to compute the engine load value, EL, as a ratio of FC and the difference between a "full-load" fueling value and a "no-load" fueling value, wherein the "full-load" and "no-load" fueling values are typically calibratible values stored in memory 45. Those skilled in the art will recognize that block 92 may alternatively be configured to compute the engine load value, EL, according to other known functions of the fueling command, FC, and/or other engine operating conditions, and any other such alternate configuration of block 92 is intended to fall within the scope of the claims appended hereto. In any case, the engine load value, EL, is generally a parameter that is indicative of the amount of work being done by the engine 12.

Control computer 42 further includes a delta pressure ($\Delta P$) sensor high/low diagnostic logic block 94 having an engine speed input, ES, receiving the engine speed signal on signal path 46, an EGR valve position input, EGRP, receiving the EGR valve position signal on signal path 76, a $\Delta P$ input, $\Delta P$, receiving the delta pressure signal on signal path 50 and/or on signal path 56, and an engine load input receiving the engine load value, EL, produced by the engine load determination block 92. Logic block 94 may further optionally include an ambient pressure input, $\Delta P$, receiving an ambient pressure signal on signal path 64, and an ambient temperature input, AT, receiving an ambient temperature signal on signal path 60. The $\Delta P$ sensor high/low diagnostic block 94 is operable, as will be described in greater hereinafter, to process the foregoing input signals and values and determine whether a delta pressure sensor high error or fault exists, corresponding to an error or fault condition wherein the $\Delta P$ sensor 48 (and/or $\Delta P$ sensor 54) produces a delta pressure signal that corresponds to a higher than expected pressure value. Block 94 has a $\Delta P$ sensor high error flag output, $\Delta PHEF$, producing a $\Delta P$ sensor high error flag indicative of whether such an error or fault condition exists, and memory 45 of control computer 42 includes a $\Delta P$ sensor diagnostic flag section 95 having the $\Delta P$ sensor high error flag stored therein. In one embodiment, for example, block 94 is operable to set or log the $\Delta P$ sensor high error flag in the memory section 95 under conditions wherein the $\Delta P$ sensor 48 (and/or $\Delta P$ sensor 54) produces a delta pressure signal that corresponds to a higher than expected pressure value, and to otherwise clear the $\Delta P$ sensor high error flag from memory section 95.

The $\Delta P$ sensor high/low diagnostic block 94 may further be operable, as will be described in greater hereinafter, to process the foregoing input signals and determine whether a delta pressure sensor low error or fault exists, corresponding to an error or fault condition wherein the $\Delta P$ sensor 48 (and/or $\Delta P$ sensor 54) produces a delta pressure signal that corresponds to a lower than expected pressure value. In this embodiment, block 94 may have a $\Delta P$ sensor low error flag output, $\Delta PLEF$, producing a $\Delta P$ sensor low error flag indicative of whether such an error or fault condition exists, as shown in phantom in FIG. 2, and such a $\Delta P$ sensor low error flag may be stored in memory section 95. In one embodiment, for example, block 94 is operable to set or log the $\Delta P$ sensor low error flag in the memory section 95 under conditions wherein the $\Delta P$ sensor 48 (and/or $\Delta P$ sensor 54) produces a delta pressure signal that corresponds to a lower than expected pressure value, and to otherwise clear the $\Delta P$ sensor low error flag from memory section 95.

Control computer 42 further includes a $\Delta P$ sensor in-range diagnostic logic block 96 having a $\Delta P$ input receiving the delta pressure signal on signal path 50, an EGR valve position input, EGRP, receiving the EGR valve position signal on signal path 76, and a number of error flag inputs, EF, each receiving an error flag value corresponding to an error status of a $\Delta P$ sensor-related component of system 10. For example, one of the error flag values received by block 96 is the delta pressure sensor high error flag produced at the $\Delta PHEF$ output of diagnostic logic block 94. Another may be, for example, the delta pressure sensor low error flag produced at the $\Delta PLEF$ output of diagnostic logic block 96. Examples of other error flag values received at the error flag inputs, EF, in one illustrative embodiment of diagnostic logic block 96 will be described hereinafter with respect to FIGS. 9–11. In any case, the $\Delta P$ sensor in-range diagnostic block 96 is operable, as will be described in greater detail hereinafter, to process the foregoing input signals and values and determine whether an in-range delta pressure error or fault exists. Block 96 has a $\Delta P$ sensor in-range error flag output, $\Delta PIREF$, producing a $\Delta P$ sensor in-range error flag indicative of whether such an error or fault condition exists, and such a $\Delta P$ sensor in-range error flag stored may be stored in memory section 95. In one embodiment, for example, block 96 is operable to set or log the $\Delta P$ sensor in-range error flag in the memory section 95 under conditions wherein a $\Delta P$ sensor in-range error or fault exists, and to otherwise clear the $\Delta P$ sensor in-range error flag from memory section 95.

Control computer 42 further includes a $\Delta P$ rationality diagnostic block 98 receiving at one input the exhaust manifold pressure signal, EP, on signal path 57, and receiving at another output the intake manifold pressure signal, IMP, on signal path 53. The ΔP rationality diagnostics block 98 is operable, as will be described in greater detail hereinafter, to process the input signals and determine whether a delta pressure sensor rationality error or fault exists, corresponding to specified operating conditions wherein the ΔP sensor 48 (and/or ΔP sensor 54) produces a delta pressure signal that corresponds to positive exhaust gas flow through EGR conduit 38 from the exhaust manifold 30 to the intake manifold 14 but wherein the exhaust manifold pressure signal, EP, and the intake manifold pressure signal, IMP, indicate otherwise. Block 98 has a ΔP sensor rationality error or fault flag output, ΔPRF, producing a ΔP sensor rationality error flag indicative of whether such an error or fault condition exists, and such a ΔP sensor high error flag is stored in memory section 95. In one embodiment, for example, block 94 is operable to set or log the ΔP sensor rationality error flag in the memory section 95 under conditions wherein under conditions corresponding to a ΔP sensor rationality error, and to otherwise clear the ΔP sensor rationality error flag from memory section 95.

Figure 3:
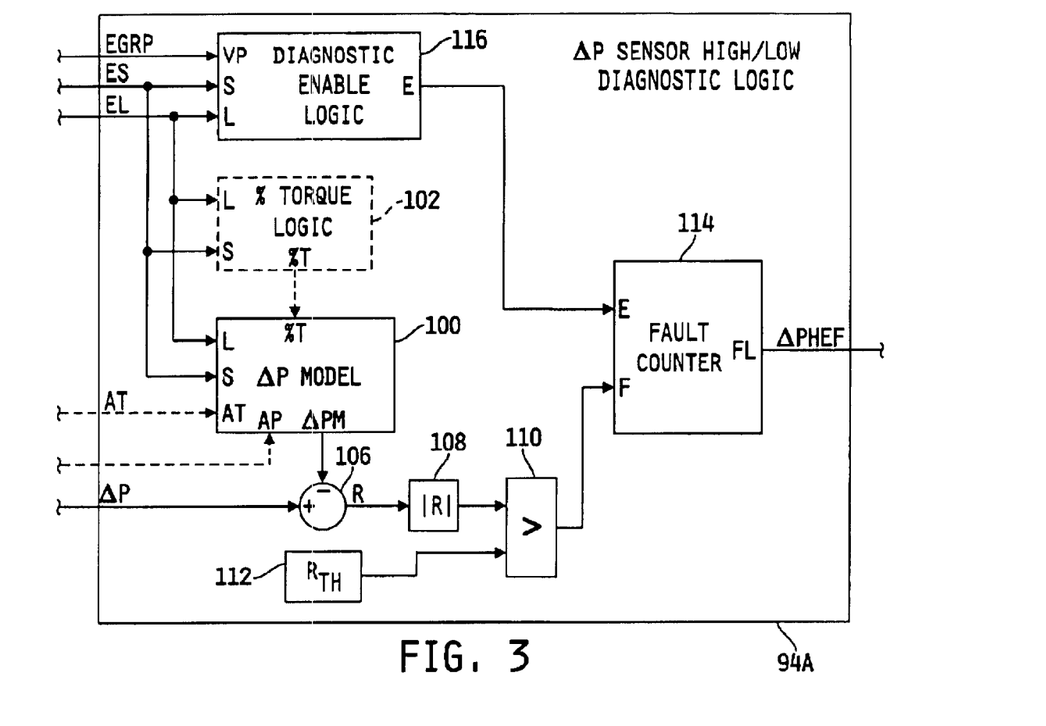
FIG. 3 is a block diagram of one illustrative embodiment of the ΔP sensor High/Low diagnostic logic block of FIG. 2.

Referring now to FIG. 3, a block diagram of one illustrative embodiment 94A of the ΔP sensor High/Low diagnostic logic block 94 of FIG. 2 is shown. In this embodiment, block 94A includes a ΔP model block 100 having a load input, L, receiving the engine load value, EL, produced by the engine load determination block 92, and a speed input, S, receiving the engine speed signal, ES. Block 94A is operable to process the foregoing input value and signal, and produce a modeled delta pressure value, $\Delta P_M$, corresponding to an expected value of the pressure differential across the EGR valve 36 and of the pressure differential across the flow restriction mechanism 52 in embodiments of system 100 including flow restriction mechanism 52. In an alternate embodiment, the engine load input, L, of the ΔP model block 100 is replaced with a torque percentage input, % T, receiving an engine output torque percentage value, % T, produced by a % torque logic block 102 shown in phantom in FIG. 3. In this embodiment, logic block 102 receives as inputs the engine load value, EL, produced by the engine load determination block 92, and the engine speed signal, ES, and is configured to compute engine output torque percentage, % T, according to known relationships between engine output torque percentage and engine speed and load. In either case, the ΔP model contained within ΔP model block 100 may be made more robust by including in the model the effects of ambient pressure and ambient temperature, and block 100 is accordingly illustrated in FIG. 3 as having optional inputs AP and AT (shown in phantom).

Figure 4:
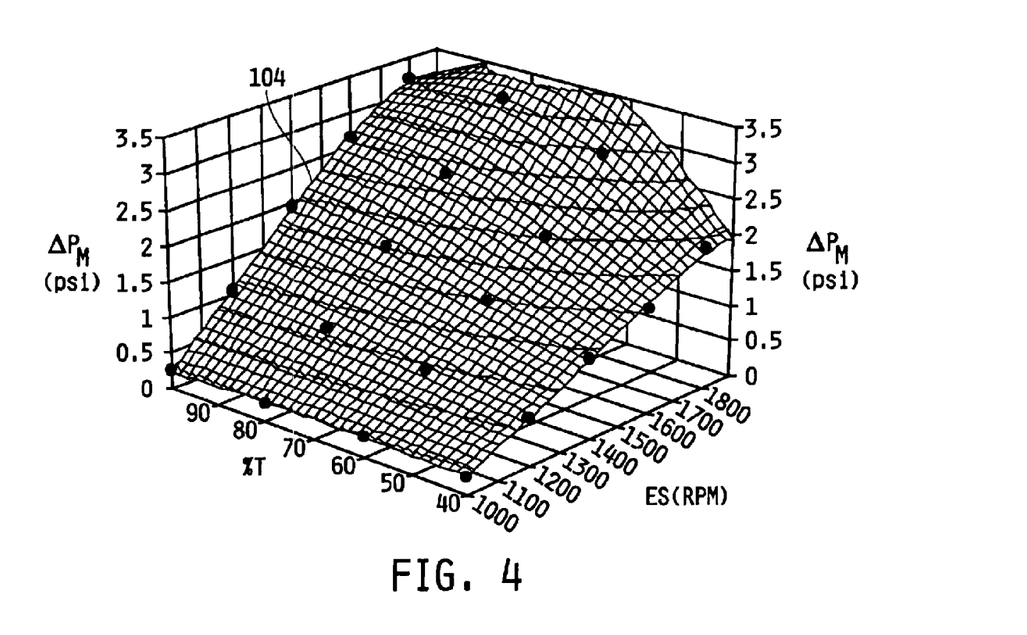
FIG. 4 is a three-dimensional plot of engine speed and engine output torque percentage vs. pressure differential, $\Delta P_M$, across either flow restriction mechanism shown in FIG. 1.

Referring now to FIG. 4, a three-dimensional plot 104 of engine speed and engine output torque percentage vs. modeled pressure differential, $\Delta P_M$, across the EGR valve 36 or flow restriction mechanism 52 is shown. In this embodiment, the % torque block 102 is included in the ΔP sensor high/low diagnostic logic block 94A, and the ΔP model contained within the ΔP model block 100 is accordingly operable to determine $\Delta P_M$ as a function of engine speed, ES, and engine output torque percentage, % T. Using known orifice flow relationships, a ΔP model was developed to estimate $\Delta P_M$ according to the relationship $\Delta P_M = f(ES, EL$ or % T, EGRP, VGTP), wherein EGRP is the EGR valve position signal and VGTP is the position of the one or more VGT actuators 82 described hereinabove with respect to FIG. 1. However, if EGRP and VGTP are kept constant, the foregoing model reduces to $\Delta P_M = f(ES, EL$ or % T) at any given EGR valve and VGT positions. An example of one such form of the ΔP model is shown in FIG. 4, wherein EGRP corresponds to a fully open EGR valve 36 and a 75% open VGT. Using the plot 104 shown in FIG. 4, $\Delta P_M$ may be determined at any engine speed and % torque value by maintaining the EGR valve 36 fully open and the VGT 75% open. The relationship between ES, % T and $\Delta P_M$ illustrated in FIG. 4 is contained within the ΔP model block 100, and controlling EGR valve 36 fully open and VGT 75% open by the control computer 42, via known techniques, are preconditions to validity of the ΔP model. It will be understood that other constant EGR valve and/or VGT positions may be used to generate the ΔP model contained within block 100, and that any such other constant EGR valve and VGT positions will be necessary preconditions to the validity of that particular ΔP model.

In any case, referring again to FIG. 3 the modeled ΔP value, $\Delta P_M$, is provided by the ΔP model block 100 to a subtraction input of a summation node 106 having an addition input receiving the ΔP signal produced by either of the ΔP sensors 48 and 54. The output of summation node 106 is a residual value, R, which corresponds to the difference $\Delta P - \Delta P_M$. This residual value, R, is provided as an input to an absolute value block 108 configured to produce as an output the absolute value of R, or |R|, and |R| is provided as a first input to an arithmetic block 110. A second input of arithmetic block 110 receives a calibratible threshold residual value, $R_{TH}$, stored in memory block 112, and the output of arithmetic block is provided to a fault input, F, of a fault counter 114. The arithmetic operator of block 110 corresponds to a "greater than" operator, such that the fault value produced by block 110 is "true" if $|R| > R_{TH}$, and is otherwise false. $R_{TH}$ may be set to any desired threshold value, and one illustrative value may be, for example, 1 psi.

Fault counter 114 further includes an enable input, E, receiving an enable value from a diagnostic enable logic block 116, and is configured to process the foregoing input values and produce an error flag at a flag output, FL, as will be described in greater detail hereinafter. The error flag produced at output FL of block 114 corresponds to the ΔP high error flag produced at the ΔP high error flag output, ΔPHEF, of the ΔP sensor high/low diagnostic logic block 94A.

In the illustrated embodiment, the diagnostic enable logic block 116 has a valve position input, VP, receiving the EGR valve position signal, EGRP, a speed input, S, receiving the engine speed signal, ES, and a load input, L, receiving the engine load value, EL. Block 116 is operable, as will be described in greater detail hereinafter, to process the foregoing input signals and produce the enable value, E, provided to the fault counter block 114. Those skilled in the art will recognize that the embodiment of block 116 shown in FIG. 3 represents only one illustrative collection of input signals thereto, and that this collection may alternatively exclude some of the illustrated signals and/or include other engine and/or system operating signals and values that are not shown in FIG. 3. Any such alternate collection of input signals to block 116 will typically be dictated by the application and/or desired accuracy of the diagnostic algorithm, and is in any case intended to fall within the scope of the claims appended hereto.

Figure 5:
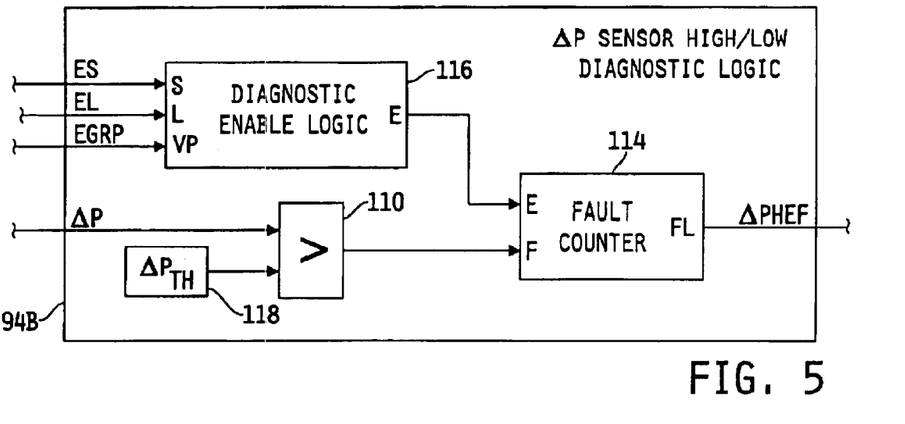
FIG. 5 is a block diagram of another illustrative embodiment of the ΔP sensor High/Low diagnostic logic block of FIG. 2.

Referring now to FIG. 5, a block diagram of another illustrative embodiment 94B of the ΔP sensor High/Low diagnostic logic block 94 of FIG. 2 is shown. In this embodiment, blocks 110, 114 and 116 are functionally identical to like numbered blocks of FIG. 3, and blocks 100–108 and 112 are replaced with a single block 118 having a calibratible delta pressure threshold value, ΔPTH, stored therein. The delta pressure threshold value, $\Delta P_{TH}$, is based on the ΔP model illustrated in FIG. 4, and represents a threshold ΔP value above which the ΔP signal on signal path 50 (or 54) would not be expected to be under specified operating conditions. For example, referring again to FIG. 4, with a fully open EGR valve 36 and VGT 75% open, $\Delta P_M$ would be expected to be less than 1 psi at engine speeds below 1200 RPM and at engine output torque values less than 80%. With a specified engine speed range or limit and a specified engine output torque range or limit (or specified engine load range or limit) as preconditions to the algorithm illustrated in block 94B, the ΔP threshold value, ΔPTH, is set to a value sufficiently above $\Delta P_M$ to allow some amount of modeling error and/or overshoot. With the example model and engine speed/torque ranges given, ΔPTH may illustratively be 2 psi, although other ΔP threshold values may be used.

Figure 6:
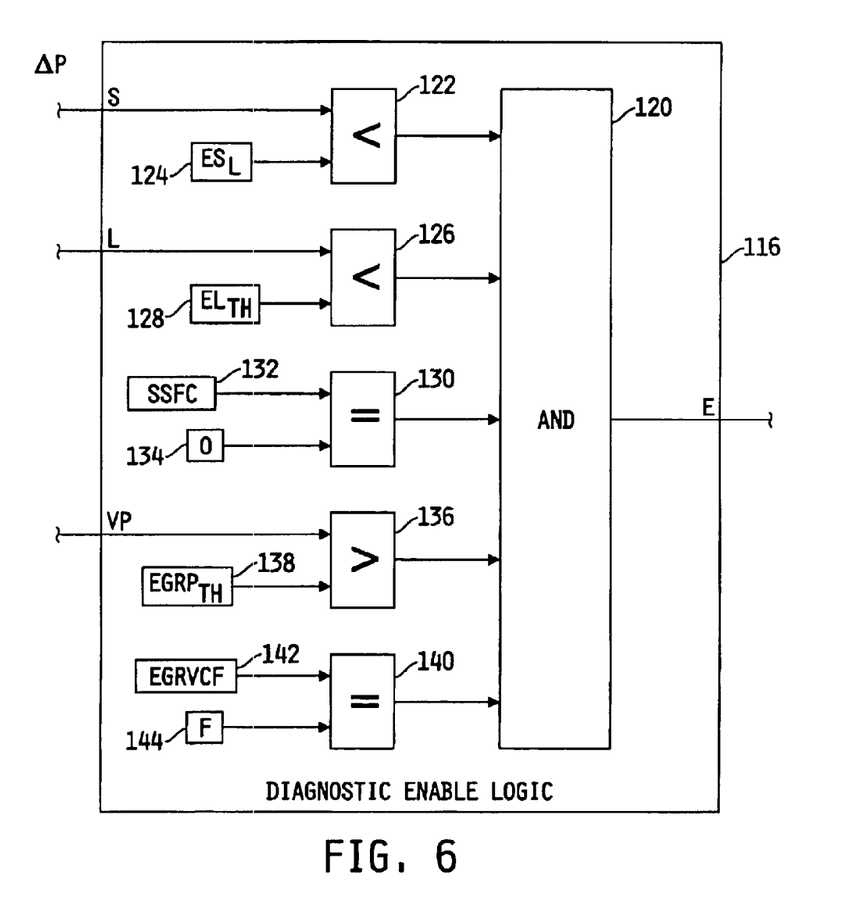
FIG. 6 is a block diagram of one illustrative embodiment of the diagnostic enable logic block of either of FIGS. 3 and 5.

Referring now to FIG. 6, a diagram of one illustrative embodiment of the diagnostic enable block 116 of either of FIGS. 3 and 5 is shown. In the illustrated embodiment, block 116 includes an "AND" block 120 having a first input receiving the output of an arithmetic block 122 configured as a "less than" arithmetic function. A first input of arithmetic block 122 receives the engine speed signal, ES, provided to the speed input, S, of block 116, and a second input of block 122 receives a calibratible engine speed limit value, $ES_L$, stored in memory block 124. The output of arithmetic block 122 is "true" as long as engine speed is less than the engine speed limit, $ES_L$, and is otherwise "false." The engine speed limit, $ES_L$, may be set to any desired engine speed limit, although it is desirable in some embodiments to set $ES_L$ to a value such that the resulting engine speed range below $ES_L$ produces a modeled ΔP value within a desired range of ΔP values. In the numerical example given hereinabove, $ES_L$ is set to 1200 RPM to ensure that the modeled ΔP value, and hence the expected ΔP signal, is less than 1 psi.

A second input of "AND" block 120 receives the output of another arithmetic block 126 configured as a "less than" arithmetic function. A first input of arithmetic block 126 receives the engine load signal, EL, provided to the load input, L, of block 116, and a second input of block 126 receives a calibratible engine load limit value, $EL_L$, stored in memory block 128. The output of arithmetic block 126 is "true" as long as engine load is less than the engine load limit, $ES_L$, and is otherwise "false." The engine load limit, $EL_L$, may be set to any desired engine load limit, although it is desirable in some embodiments to set $EL_L$ to a value such that the resulting engine load range below $EL_L$ produces a modeled ΔP value within a desired range of ΔP values. In the numerical example given hereinabove, $EL_L$ is set to a value corresponding to 80% engine output torque to ensure that the modeled ΔP value, and hence the expected ΔP signal, is less than 1 psi.

A third input of "AND" block 120 receives the output of another arithmetic block 130 configured as an "equals" arithmetic function. A first input of arithmetic block 130 receives a sensor supply fault count value, SSFC, stored in memory block 132 by a known sensor supply fault algorithm executed by control computer 42, and a second input of block 130 receives a constant value; e.g., 0, stored in memory block 134. The output of arithmetic block 130 is "true" as long as the sensor supply fault count value, SSFC, is equal to 0, and is otherwise "false." The sensor supply fault algorithm is a known algorithm operable to monitor one or more of the system sensors and determine whether a fault relating to each of the sensor's supply voltage is present, and if so to maintain a count value of the fault condition. If no sensor supply faults exist, this count value will generally be zero.

A fourth input of "AND" block 120 receives the output of another arithmetic block 136 configured as a "greater than" arithmetic function. A first input of arithmetic block 136 receives the EGR valve position signal, EGRP, provided to the value position input, VP, of block 116, and a second input of block 136 receives a calibratible EGR valve position threshold value, $EGRP_{TH}$, stored in memory block 138. The output of arithmetic block 136 is "true" as long as the EGR valve position signal, EGRP, is greater than the EGR valve position threshold value, $EGRP_{TH}$, and is otherwise "false." The EGR valve position threshold value, $EGRP_{TH}$, may be set to any desired threshold value, although it is desirable in some embodiments to set $EGRP_{TH}$ to a value that ensures that the EGR valve 36 is fully open as described hereinabove.

A fifth input of "AND" block 120 receives the output of another arithmetic block 140 configured as an "equals" arithmetic function. A first input of arithmetic block 140 receives an EGR valve control fault value, EGRVCF, stored in memory block 142 by a known EGR valve control fault algorithm executed by control computer 42, and a second input of block 140 receives a constant "false" value stored in memory block 144. The output of arithmetic block 140 is "true" as long as there is not EGR valve control fault present, and is otherwise "false." The EGR valve control fault algorithm is a known algorithm operable to monitor the control of the EGR valve 36 by the control computer 42 and determine whether a fault relating to each of this control is present, and if so to set the EGR valve control fault value in memory location 142 to "true."

In some embodiments, it may be desirable to include a sixth input to "AND" block 120 that is "true" only if the one or more VGT actuators are above or below a desired VGT actuator position limit, or are within a desired VGT actuator position range, to ensure validity of the ΔP as described hereinabove; e.g., VGT 75% open, and is otherwise false. However, such VGT logic requires information relating to the position of the one or more VGT actuators, and the illustrated embodiment of system 10 does not include any such VGT position sensors.

In any case, the output of "AND" block 120 defines the enable output, E, of the diagnostic enable logic block 116, and is "true" only if all of the inputs to "AND" block 120 are "true", and is otherwise "false." In order for the output of "AND" block 120 to be "true", control computer 42 must, as a precondition, command engine speed to an engine speed value below $ES_L$, and command the EGR valve 36 fully open. Moreover, for the ΔP model to be valid, the control computer 42 must further command the one or more VGT actuators to the position upon which the ΔP model is based as described hereinabove. The remaining enable conditions will be defined by resulting or existing operation of the engine control system.

Those skilled in the art will recognize that the diagnostic enable logic block 116 of FIG. 6 represents only one illustrative collection of ΔP sensor high/low diagnostic enabling conditions, and that this collection may alternatively exclude some of the listed conditions and/or include other engine and/or system operating condition that are not illustrated in FIG. 6. Any such alternate collection of enabling conditions will typically be dictated by the application and/or desired accuracy of the diagnostic algorithm, and is in any case intended to fall within the scope of the claims appended hereto. It will be further recognized that block 116 will require modifications to the illustrated logic in cases where engine speed, engine load and/or EGR valve position ranges are desired rather than limit or threshold values as illustrated, and any such logic modifications would be a mechanical step for a skilled artisan.

Figure 7:
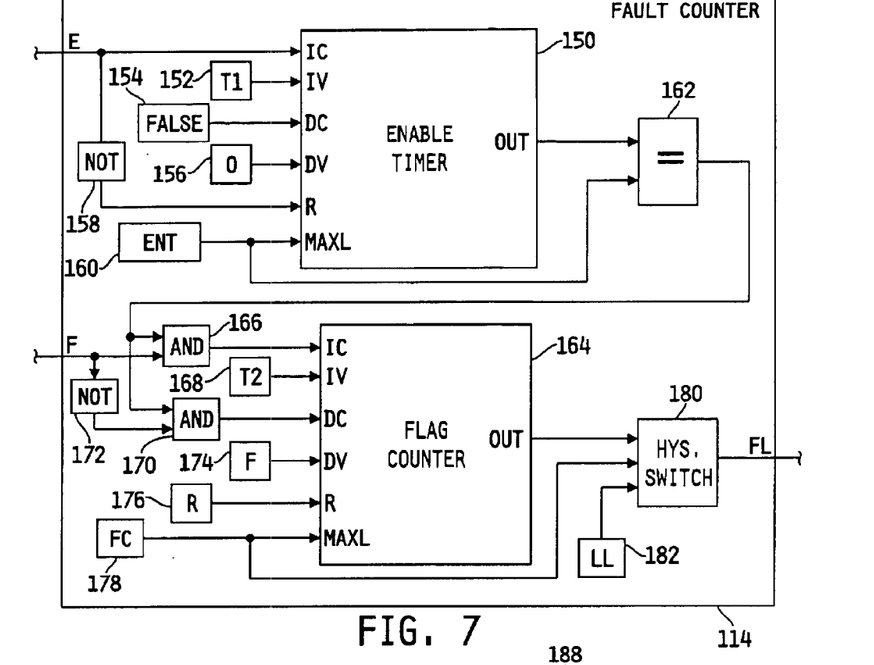
FIG. 7 is a block diagram of one illustrative embodiment of the fault counter block of either of FIGS. 3 and 5.

Referring now to FIG. 7, a block diagram of one illustrative embodiment of the fault counter block 114 of either of FIGS. 3 and 5 is shown. In the illustrated embodiment, block 114 includes an enable timer block 150 having an increment condition input, IC, receiving the enable value provided by the diagnostic enable logic block 116 to the enable input, E, of block 114. Timer block 150 further includes an increment value input, IV, receiving a calibratible timer increment value, T1, stored in memory block 152. A decrement condition input, DC, of block 150 receives a "false" value stored in memory block 154, and a decrement value input, DV, of block 150 receives a constant value, e.g., 0, stored in memory block 156. A reset input, R, of timer block 150 receives the output of a "NOT" block 158 having an input receiving the enable value received at the enable input, E, of block 114, and a maximum limit input, MAXL, of timer block 150 receives a calibratible enable timer limit value, ENT, stored in block 160. An output, OUT, of timer block 150 is provided to one input of an arithmetic block 162 configured as an "equals" operator, and a second input of arithmetic block 162 receives the enable timer limit value, ENT.

With the decrement condition input of counter block 150 set to "false", block 150 is configured as an incrementing counter operable to increment, following a reset, by the value of "T1" from zero up to the value of ENT as long as the enable value received at the enable input, E, of block 114 is true. While block 150 is reset, and while the timer output, OUT, is not equal to the ENT, the output of arithmetic block 162 is "false." However, when the output, OUT, reaches the calibratible timer value, ENT, the output of arithmetic block 162 switches from "false" to "true", and remains "true" until the timer block 150 receives a reset. The enable timer thus requires each of the diagnostic enabling conditions described hereinabove with respect to FIG. 6 to be true for the calibratible time value, ENT, wherein ENT may be any desired time value, including zero.

The fault counter block 114 further includes a flag counter block 164 having an increment condition input, IC, receiving the output of an "AND" block 166 having a first input receiving the output of the arithmetic block 162 and a second input receiving the fault value received at the fault input, F, of block 114. Flag counter block 164 further includes an increment value input, IV, receiving a calibratible increment value, T2, stored in memory block 168. A decrement condition input, DC, of block 164 receives the output of another "AND" block 170 having a first input receiving the output of arithmetic block 162 and a second input receiving the output of another "NOT" block receiving as an input the fault value received at the fault input, F, of block 114. A decrement value input, DV, of block 164 receives a decrement value, F, stored in memory block 174. A reset input, R, of counter block 164 receives a reset value, R, stored in memory block 176, and in the illustrated embodiment R is set to zero so that the counter block 164 is never in reset. A maximum limit input, MAXL, of counter block 164 receives a calibratible flag counter limit value, FC, stored in block 178. An output, OUT, of counter block 164 is provided to one input of a hysteresis switch 180 having an upper switch limit set to the flag counter limit value, FC, and a lower limit set by a lower limit value, LL, stored in memory block 182. The output of hysteresis switch 180 corresponds to the flag output, FL, of the fault counter block 114.

With the reset input of flag counter block 164 always set to "false", block 164 is configured to increment its count value by the value of "T2", up to the value of FC, as long as the fault value received at the fault input, F, of block 114 is "true" and the output of the arithmetic operator block 162 is also "true", and to decrement its count value by the value of "F", down to the value of zero, as long as the fault value received at the fault input, F, of block 114 is "false" and the output of the arithmetic operator block 162 is "true." The flag output, FL, is set to "true" when the output, OUT, of the flag counter block 164 exceeds the flag counter limit value, FC, and is set to "false" when the output, OUT, of the flag counter block 164 falls below the lower limit value, LL.

Figure 8:
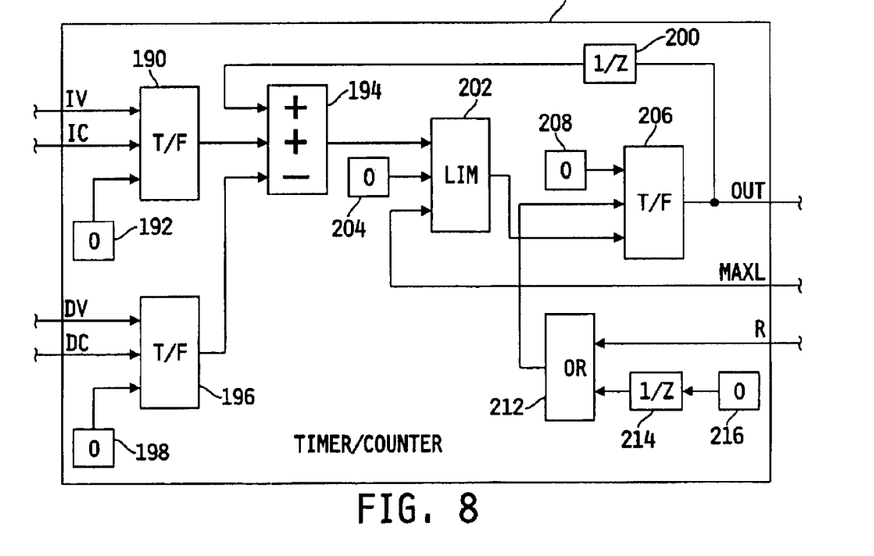
FIG. 8 is a block diagram of one illustrative embodiment of a timer/clock, which may be configured for use as the enable timer and the flag counter of FIG. 7.

Referring now to FIG. 8, a block diagram of one illustrative embodiment of a timer/clock 188, which may be configured for use as the enable timer 150 and as the flag counter 164 of FIG. 7, is shown. In the illustrated embodiment, timer/clock 188 includes a true/false block 190 having a "true" input receiving the increment value provided to input IV, a "false" input receiving a constant value; e.g., 0, stored in memory block 192, and a control input receiving the increment condition value provided to input IC of timer/counter 188. The output of true/false block 190 is provided to a first addition input of a summation block 194 having a second addition input receiving a delayed representation of the output signal produced at output OUT of the timer/counter 188 from a delay block 200. A subtraction input of summation block 194 receives the output of another true/false block 196 having a "true" input receiving the decrement value provided to input DV, a "false" input receiving a constant value; e.g., 0, stored in memory block 198, and a control input receiving the decrement condition value provided to input DC of timer/counter 188. The output of summation block 194 is supplied to a limiter block 202 having an upper limit established by the maximum limit value provided to input MAXL of timer/counter 188, and having a lower limit established by a constant; e.g., 0, stored in memory block 204. The output of limiter block 202 is supplied as a "false" input of true/false block 206 having a "true" input receiving a constant value; e.g., 0, stored in memory block 208. A control input of true/false block 206 is received from the output of an "OR" block 212 having a first input receiving the reset value provided to the R input of timer/counter 188, and a second input receiving the output of a delay block 214 having an input receiving a constant; e.g., 0, stored in memory block 216. The output of true/false block 206 defines the output, OUT, of the timer/counter 188.

In operation, the true/false block 190 and summation block 194 add the increment value, IV, to the previous time or count value whenever the increment condition, IC, is true, and the true/false block 196 and summation block 194 subtract the decrement value, DV, from the previous time or count value whenever the decrement condition, DC, is true. This updated time or count value is limited to a maximum of the MAXL value and to a minimum of zero. The limited time or count value produced by the limiter block 206 is the output, OUT, of the timer/counter 188 whenever the timer/counter 188 is not reset; i.e., whenever "R" is "false", and whenever the timer/counter 188 is reset, i.e., whenever "R" is "true", the output, OUT, of the timer/counter 188 is zero.

The timer/counter 188 may be used as the enable timer 150 by providing timer increments to the IV and DV inputs, as illustrated in FIG. 7, and may also be used as the flag counter 164 by providing integer values to the IV and DV inputs as also illustrated in FIG. 7. Any increment, decrement and MAXL values may be used, including zero, to implement the timer/counter 188 as either of the enable timer 150 and the flag counter 164. In any case, the fault counter block 114 of either of FIGS. 3 and 5 is operable to set the ΔP high error flag, ΔPHEF, to "true" if all of the diagnostic enable conditions are "true", the enable timer 150 has timed out with all of the diagnostic enable conditions being true, and the output of the arithmetic operator block 110 is "true" long enough for the count value produced by the flag counter 164 to exceed the upper switch threshold, FC. Conversely, the fault counter block 114 is operable to set the ΔP high error flag, ΔPHEF, to "false" if all of the diagnostic enable conditions are "true", the enable timer 150 has timed out with all of the diagnostic enable conditions being true, and the output of the arithmetic operator block 110 is "false" long enough for the count value produced by the flag counter 164 to drop below the lower switch threshold, LL.

It will be understood that the ΔP sensor high/low diagnostic logic block 94 may be configured in a manner consistent with the foregoing description to produce a ΔP low error flag, ΔPLEF, as illustrated in phantom in FIG. 2. In such a configuration, blocks 94A and/or 94B would be modified such that the preconditions to the diagnostic enable logic block 116 would be configured to ensure engine/VGT operating ranges or limits under which the modeled ΔP value, $\Delta P_M$, could be easily distinguished from the ΔP signal produced by either of sensors 48 and 54, the diagnostic enable logic block 116 would be configured to enable the fault counter only if such preconditions were met, and blocks 110,112 an 118 would be modified to compare the ΔP signal or residual value, R, to low threshold values. Any such modifications would be a mechanical step for a skilled artisan.

Figure 9:
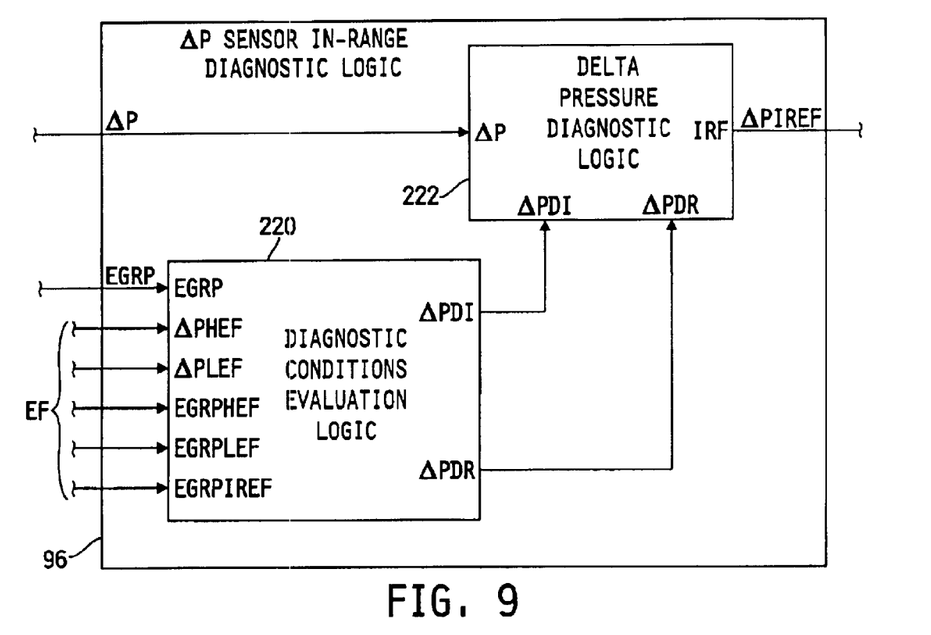
FIG. 9 is a block diagram of one illustrative embodiment of the ΔP sensor in-range diagnostic logic block of FIG. 2.

Referring now to FIG. 9, a block diagram of one illustrative embodiment of the ΔP sensor in-range diagnostic logic block 92 of FIG. 2 is shown. In the illustrated embodiment, block 92 includes a diagnostic conditions evaluation logic block 220 having an EGR valve position input, EGRP, receiving the EGR valve position signal, EGRP, produced by sensor 74, and a number of error flag values produced by control computer 42 according to one or more diagnostic algorithms resident within, and executed by, control computer 42. For example, one of the error flag values is the ΔP high error flag, ΔPHEF, produced by the ΔP sensor high/low diagnostic logic block 94 as just described. Another is the ΔP low error flag, ΔPLEF, which may be produced by the ΔP sensor high/low diagnostic logic block 94 also as just described. The remaining three error flags are EGR valve position related error flags, and include an EGR valve position high error flag, EGRPHEF, an EGR valve position low error flag, EGRPLEF and an EGR valve position in-range error flag, EGRPIREF, and each of these three flags may be produced by one or more known EGR valve position diagnostic algorithms executed by control computer 42. In any case, the diagnostic conditions evaluation logic block 220 is operable, as will be described in greater detail hereinafter, to process the foregoing input signal and values to produce a ΔP diagnostic reset value, ΔPDR, and a ΔP diagnostic inhibit value, ΔPDI. These two ΔP diagnostic values are provided, along with the ΔP signal produced by sensor ΔP sensor 48 or 54, as inputs to a delta pressure diagnostic logic block 222. Block 222 is operable, as will be described in greater detail hereinafter, to process the foregoing signal and values and produce a ΔP in-range error flag, ΔPIREF, at an in-range flag output, IRF, thereof. The in-range flag output, IRF, of block 222 also defines the ΔPIREF output of block 96.

Figure 10:
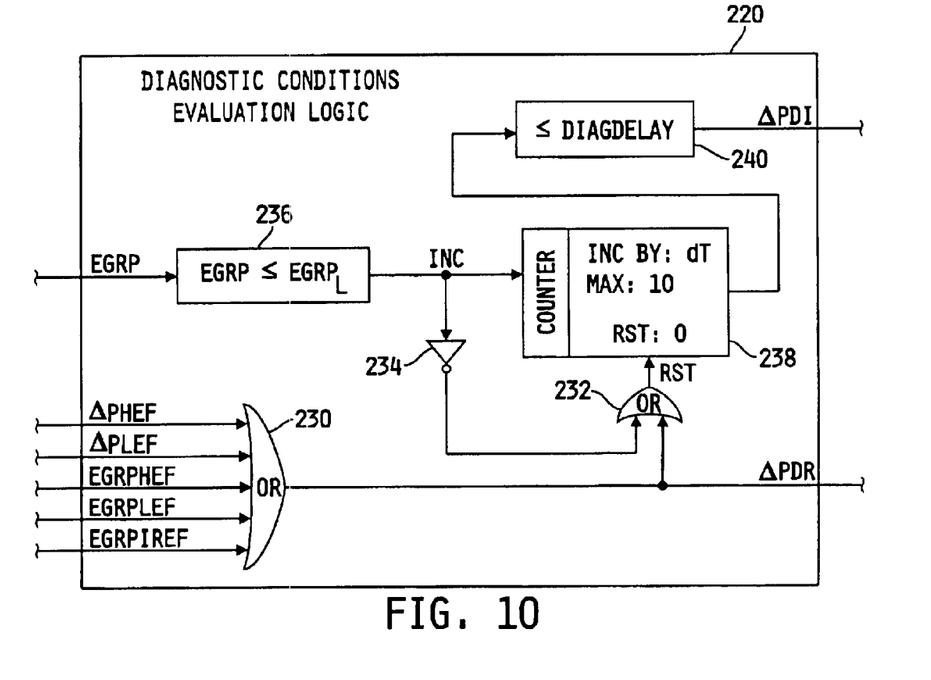
FIG. 10 is a block diagram of one illustrative embodiment of the diagnostic conditions evaluation logic block of FIG. 9.

Referring now to FIG. 10, a block diagram of one illustrative embodiment of the diagnostic condition evaluation logic block 220 is shown. In the illustrated embodiment, block 220 includes an "OR" block having a number of inputs each receiving a different one of the error flag values, ΔPHEF, ΔPLEF, EGRPHEF, EGRPLEF and EGRPIREF. The output of "OR" block 230 defines the ΔP diagnostic reset output, ΔPDR, of block 220, and is "true" if any one of the error flags ΔPHEF, ΔPLEF, EGRPHEF, EGRPLEF and EGRPIREF is true, and is "false" only if none of the error flags ΔPHEF, ΔPLEF, EGRPHEF, EGRPLEF and EGRPIREF are true.

The output of "OR" block 230 is also supplied to one input of another "OR" block 232 having a second input receiving the output of an inverter 234. The input of inverter 234 is supplied by an output of an arithmetic function block 236 having an input receiving the EGR valve position signal, EGRP. The arithmetic function defined by block 236 is $EGRP \leq EGRP_L$, wherein $EGRP_L$ represents an upper EGR valve position limit value. If $EGRP < EGRP_L$, the output of block 236 is "true" and the second input of "OR" block 232 is thus "false." The outputs of "OR" block 232 and arithmetic function block 236 are both provided to a counter 238 having an output provided to another arithmetic function block 240 defining the function "≦DIAGDELAY", wherein DIAGDELAY is a calibratible delay period less than the maximum counter value, and having an output defining the ΔP diagnostic inhibit output, ΔPDI, of block 220. As long as the output of counter 238 is less than or equal to DIAGDELAY, the ΔP diagnostic inhibit value, ΔPDI, is "true", and is otherwise "false."

In operation, the counter block 238 is maintained in reset as long as none of the error flags are "true" and as long as $EGRP \leq EGRP_L$. Under such conditions, the counter value is less than DIAGDELAY and ΔPDI is therefore "true." If, however, any one of the error flags is "true", the counter 238 is no longer reset and increments its count value by a calibratible value, dT, as long as $EGRP \leq EGRP_L$. When the count value of the counter block 238 exceeds DIAGDELAY, the ΔP diagnostic inhibit output, ΔPDI, switches to "false."

Figure 11:
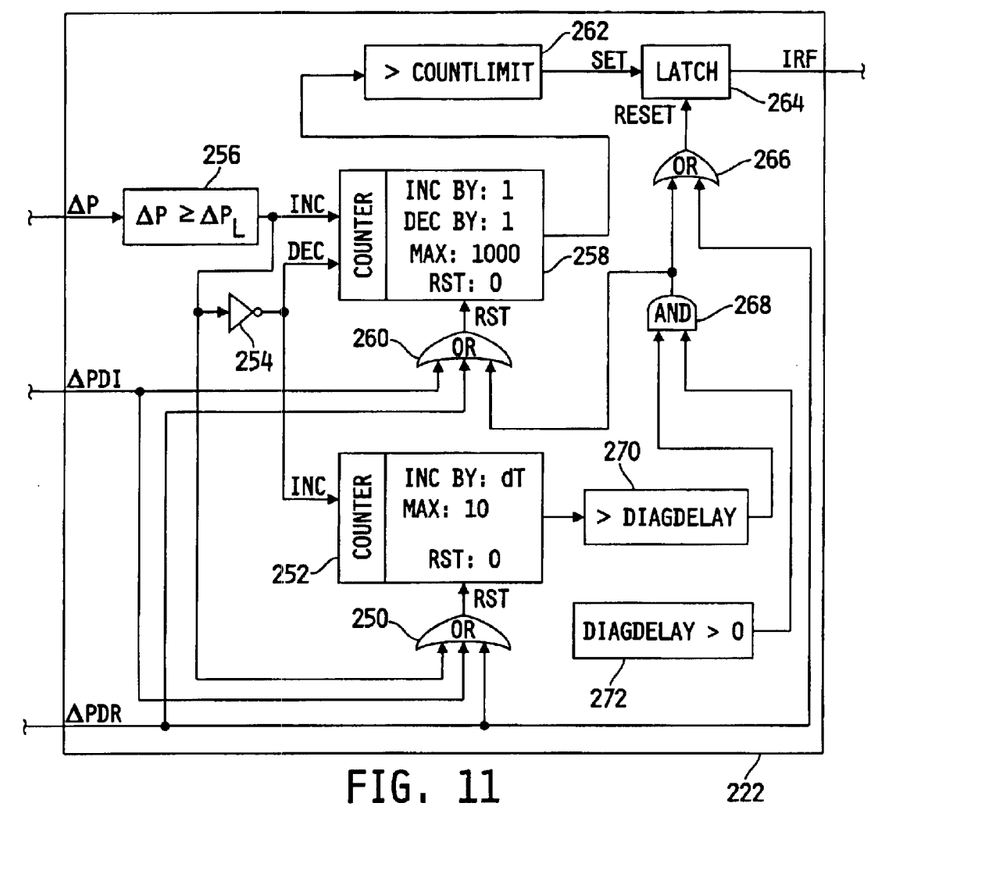
FIG. 11 is a block diagram of one illustrative embodiment of the delta pressure diagnostic logic block of FIG. 9.

Referring now to FIG. 11, a diagram of one illustrative embodiment of the delta pressure diagnostic logic block 222 is shown. In the illustrated embodiment, block 222 includes an "OR" block 250 having a first input receiving the ΔP diagnostic reset value, ΔPDR, produced by block 220, a second input receiving the ΔP diagnostic inhibit value, ΔPDI, also produced by block 220, and a third input receiving the output of an arithmetic function block 256 having an input receiving the ΔP signal produced by sensor 48 or 54. The arithmetic function block 256 defines the function "ΔP $\Delta P \geq \Delta P_L$", where $\Delta P_L$ represents a lower ΔP limit value. The output of block 256 is supplied as an input to an inverter 254 having an output supplying an increment enable command to a counter 252. The output of "OR" block 250 provides a reset value to a reset input of counter 252, and counter 252 is accordingly reset only if ΔPDR, ΔPDI and the output of arithmetic function block 256 are all "false". If one of these values is true, and the output of inverter 254 is "true", counter 252 increments at the calibratible rate of dT to a maximum count value of 10. The output of counter 252 is supplied to another arithmetic function block 270 defining the function ">DIAGDELAY", and the output of this block is provided as a first input of an "AND" block 268 having a second input receiving the output of another arithmetic function block 272 defining the function "DIAGDELAY>0". Thus, if DIAGDELAY is greater than zero, and the count value of the counter block 252 is greater than DIAGDELAY, the output of "AND" block 268 is "true", and is otherwise "false".

Block 222 further includes another "OR" block 260 having a first input receiving the output of "AND" block 268, a second input receiving the ΔP diagnostic reset value, DR, and a third input receiving the ΔP diagnostic inhibit value, ΔPDI. The output of "OR" block 260 provides a reset value to a reset input of anther counter block 258 having an increment command input receiving the output of arithmetic function block 256 and a decrement command input receiving the output of inverter 254. When counter 258 is not in reset, it is configured to increment or decrement by 1 up to a maximum of 1000. The output of counter 258 is supplied as an input to another arithmetic function block 262 defining the function ">COUNTLIMIT", wherein COUNTLIMIT is a calibratible count value. The output of arithmetic function block 262 is supplied to a "set" input of a latch 264 having a "reset" input receiving the output of an "OR" block 266. One input of "OR" block 266 receives the output of "AND" block 268, and another input of "OR" block 266 receives the ΔP diagnostic reset value, ΔPDR. The output of latch 264 defines the in-range error flag output, IRF, of block 222, which corresponds to the ΔP in-range error flag output, ΔPIREF, of the ΔP sensor in-rage diagnostic logic block 96.

In operation, if any of the error flags are "true", the latch 264 is reset, and the in-range flag value is therefore "false", the counter 252 increments its count value as long as $\Delta P < \Delta P_L$, and the counter 258 increments its count value as long as $\Delta P \geq \Delta P_L$, and otherwise decrements its count value. When the count value of the counter 258 exceeds COUNTLIMIT, latch 263 is set and the in-range flag value, IRF, is set to "true".

Figure 12:
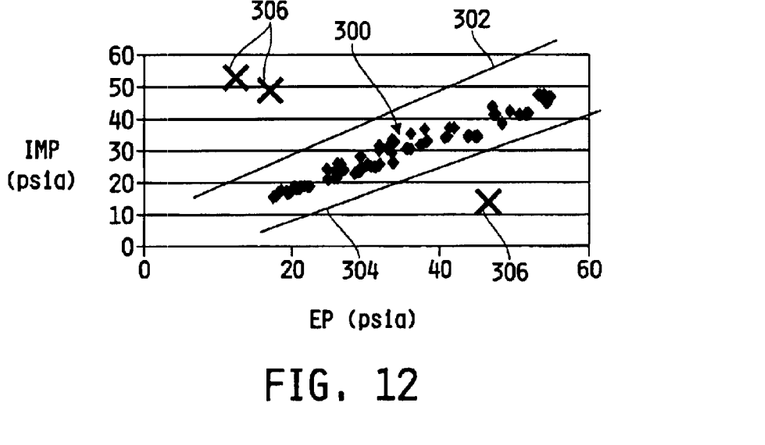
FIG. 12 is a plot of intake manifold pressure vs. exhaust manifold pressure illustrating one embodiment of the ΔP rationality diagnostic block of FIG. 2.

Referring again to FIG. 2, the ΔP rationality diagnostic block 98 is operable to process the exhaust manifold pressure signal, EP, and the intake manifold pressure is signal, IMP, and produce a ΔP rationality flag, ΔPRF. Generally, when the EGR valve 36 is open, it is expected that there will exist a positive pressure differential across the valve 36 such that engine exhaust gas will flow through the EGR valve 36 to the intake manifold 14. This positive pressure will generally increase as engine speed and load increase, and in one embodiment of block 98 the ΔP rationality diagnostic includes commanding engine speed above a calibratible threshold engine speed value; e.g., near rated speed, and engine load must be above a calibratible load value; e.g., 80%. Under such conditions, a residual value is calculated as a difference between EP and IMP, and if this residual is less than a minimum pressure value the ΔP rationality flag, ΔPRF, is set to "true", and is otherwise set to "false." As an alternative approach to the ΔP rationality diagnostic block 98, a plot of IMP vs. EP may be made as illustrated in FIG. 12. Under the rationality test just described, pressure residual values for a normally functioning system would be expected to fall within the data group 300, and pressure residual values for an abnormally functioning system would be expected to form data points 306 outside of the data group 302. A pair of data boundaries 302 and 304 may accordingly be defined, such that if a pressure residual value falls between the predefined boundaries 302 and 304, the ΔP rationality flag, ΔPRP, is cleared, but if the pressure residual value falls outside of either of the predefined boundaries 302 and 304, the ΔP rationally flag, ΔPRP, is set or logged.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for diagnosing operation of a delta pressure sensor used with an internal combustion engine, comprising:

an intake manifold and an exhaust manifold each operatively coupled to the engine;

an EGR conduit fluidly coupled between the intake and exhaust manifolds;

a flow restriction mechanism disposed in-line with the EGR conduit, the delta pressure sensor producing a delta pressure signal indicative of a pressure differential across the flow restriction mechanism; and a control computer comparing the delta pressure signal to a modeled delta pressure value modeled as a function of at least engine speed and one of engine load and engine output torque percentage, the control computer diagnosing a fault state of the delta pressure sensor based on the comparison.

2. The system of claim 1 wherein the flow restriction mechanism is an EGR valve having an actuator responsive to an actuator signal to control exhaust gas flow through the EGR valve;

and wherein the control computer is configured to produce the actuator signal.

3. The system of claim 1 further including an EGR valve having an actuator responsive to an actuator signal to control exhaust gas flow through the EGR valve;

wherein the flow restriction mechanism is disposed in-line with the EGR conduit between the EGR valve and the intake manifold.

4. The system of claim 1 further including an engine speed sensor producing an engine speed signal indicative of engine rotational speed;

and wherein the control computer is configured to determine an engine load value as a function of engine fueling, the control computer determining the modeled delta pressure value as a function of the engine speed signal and the engine load value according to a predefined delta pressure model and determining a residual value as a difference between the delta pressure signal and the modeled delta pressure value, the control computer diagnosing the fault state of the delta pressure sensor based on the residual value.

5. The system of claim 4 further including an EGR valve having an actuator responsive to an actuator signal to control exhaust gas flow through the EGR valve;

and wherein the control computer is configured to control the actuator signal to command the EGR valve to a predefined valve position prior to determining the modeled delta pressure value.

6. The system of claim 4 further including a turbocharger operatively coupled to the intake and exhaust manifolds, the turbocharger having a variable geometry turbine (VGT) mechanism with an actuator responsive to an actuator signal to control a swallowing capacity or efficiency of the turbocharger;

and wherein the control computer is configured to control the actuator signal to command the VGT mechanism to a predefined VGT position prior to determining the modeled delta pressure value.

7. The system of claim 4 further including a memory having a delta pressure sensor diagnostic flag stored therein;

wherein the control computer further includes a flag counter operable to increment a count value if the residual value exceeds a threshold residual value and to otherwise decrement the count value, the control computer diagnosing the fault state of the delta pressure sensor by setting the delta pressure sensor diagnostic flag if the count value exceeds a high count threshold and clearing the delta pressure sensor diagnostic flag if the count value drops below a low count threshold.

8. The system of claim 7 wherein the control computer further includes diagnostic enable logic configured to enable operation of the flag counter only if a number of diagnostic enable conditions are met.

9. The system of claim 8 wherein the diagnostic enable logic is configured to enable operation of the flag counter only if the number of diagnostic enable conditions are met for a calibratible time period.

10. The system of claim 1 further including an engine speed sensor producing an engine speed signal indicative of engine rotational speed;

and wherein the control computer is configured to determine an engine output torque percentage, the control computer determining the modeled delta pressure value as a function of the engine speed signal and the engine output torque percentage according to a predefined delta pressure model and determining a residual value as a difference between the delta pressure signal and the modeled delta pressure value, the control computer diagnosing the fault state of the delta pressure sensor based on the residual value.

11. The system of claim 10 further including an EGR valve having an actuator responsive to an actuator signal to control exhaust gas flow through the EGR valve;

and wherein the control computer is configured to control the actuator signal to command the EGR valve to a predefined valve position prior to determining the modeled delta pressure value.

12. The system of claim 10 further including a turbocharger operatively coupled to the intake and exhaust manifolds, the turbocharger having a variable geometry turbine (VGT) mechanism with an actuator responsive to an actuator signal to control a swallowing capacity or efficiency of the turbocharger;

and wherein the control computer is configured to control the actuator signal to command the VGT mechanism to a predefined VGT position prior to determining the modeled delta pressure value.

13. The system of claim 10 further including a memory having a delta pressure sensor diagnostic flag stored therein;

wherein the control computer further includes a flag counter operable to increment a count value if the residual value exceeds a threshold residual value and to otherwise decrement the count value, the control computer diagnosing the fault state of the delta pressure sensor by setting the delta pressure sensor diagnostic flag if the count value exceeds a high count threshold and clearing the delta pressure sensor diagnostic flag if the count value drops below a low count threshold.

14. The system of claim 13 wherein the control computer further includes diagnostic enable logic configured to enable operation of the flag counter only if a number of diagnostic enable conditions are met.

15. The system of claim 14 wherein the diagnostic enable logic is configured to enable operation of the flag counter only if the number of diagnostic enable conditions are met for a calibratible time period.

16. The system of claim 1 further including a memory having the modeled delta pressure value stored therein in the form of a delta pressure threshold value based on a predefined delta pressure model;

and wherein the control computer is configured to diagnose the fault state of the delta pressure sensor based on the comparison between the delta pressure signal and the delta pressure threshold value.

17. The system of claim 16 further including an EGR valve having an actuator responsive to an actuator signal to control exhaust gas flow through the EGR valve;

and wherein the control computer is configured to control the actuator signal to command the EGR valve to a predefined valve position prior to diagnosing the fault state of the delta pressure sensor.

18. The system of claim 16 further including a turbocharger operatively coupled to the intake and exhaust manifolds, the turbocharger having a variable geometry turbine (VGT) mechanism with an actuator responsive to an actuator signal to control a swallowing capacity or efficiency of the turbocharger;

and wherein the control computer is configured to control the actuator signal to command the VGT mechanism to a predefined VGT position prior to determining the modeled delta pressure value.

19. The system of claim 16 wherein the control computer is configured to command the engine speed to a predefined engine speed range prior to diagnosing the fault state of the delta pressure sensor.

20. The system of claim 16 further including a memory having a delta pressure sensor diagnostic flag stored therein;

wherein the control computer further includes a flag counter operable to increment a count value if the delta pressure signal exceeds the delta pressure threshold value and to otherwise decrement the count value, the control computer diagnosing the fault state of the delta pressure sensor by setting the delta pressure sensor diagnostic flag if the count value exceeds a high count threshold and clearing the delta pressure sensor diagnostic flag if the count value drops below a low count threshold.

21. The system of claim 20 wherein the control computer further includes diagnostic enable logic configured to enable operation of the flag counter only if a number of diagnostic enable conditions are met.

22. The system of claim 20 wherein the control computer is configured to determine engine load as a function of engine fueling;

and wherein one of the number of diagnostic enable conditions corresponds to the engine load being within a predefined range of engine load values.

23. The system of claim 20 wherein the control computer is configured to determine engine output torque percentage;

and wherein one of the number of diagnostic enable conditions corresponds to the engine output torque percentage being within a predefined range of engine output torque percentage values.

24. The system of claim 20 wherein one of the number of diagnostic enable conditions corresponds to the engine speed being within a predefined range of engine speed values.

25. The system of claim 20 further including:

an EGR valve responsive to a control signal to control exhaust gas flow therethrough; and an EGR valve position sensor producing a position signal indicative of a position of the EGR valve relative to a reference position;

wherein one of the number of diagnostic enable conditions corresponds to the position signal indicating a position of the EGR valve greater than a predefined EGR valve position.

26. The system of claim 20 wherein the diagnostic enable logic is configured to enable operation of the flag counter only if the number of diagnostic enable conditions are met for a calibratible time period.

* * * * *